United States Patent
Rahmatullah et al.

Patent Number: 6,026,130
Date of Patent: Feb. 15, 2000

[54] SYSTEM AND METHOD FOR ESTIMATING A SET OF PARAMETERS FOR A TRANSMISSION CHANNEL IN A COMMUNICATION SYSTEM

[75] Inventors: Muhammad M. Rahmatullah; Philip Yip; Saf Asghar, all of Austin, Tex.

[73] Assignee: Advanced Micro Devices, Inc., Sunnyvale, Calif.

[21] Appl. No.: 08/853,430

[22] Filed: May 9, 1997

Related U.S. Application Data

[60] Provisional application No. 60/040,195, Mar. 4, 1997.

[51] Int. Cl.⁷ .............................. H03D 1/00; H04L 27/14
[52] U.S. Cl. ......................... 375/340; 375/346; 375/285; 455/63
[58] Field of Search ..................... 375/224, 227, 375/260, 285, 340, 343, 346, 348, 349, 231, 220; 455/423, 62, 63, 67.1, 67.3; 371/43.6, 43.7, 43.3

[56] References Cited

U.S. PATENT DOCUMENTS

| | | |
|---|---|---|
| 4,564,952 | 1/1986 | Karabinis et al. . |
| 5,164,961 | 11/1992 | Gudmundson . |
| 5,204,878 | 4/1993 | Larsson . |
| 5,432,816 | 7/1995 | Gozzo ..................................... 375/232 |
| 5,465,276 | 11/1995 | Larsson et al. .......................... 375/346 |
| 5,581,580 | 12/1996 | Lindbom et al. ....................... 375/340 |

Primary Examiner—Jason Chan
Assistant Examiner—Jean B Corrielus
Attorney, Agent, or Firm—Conley, Rose & Tayon; Jeffrey C. Hood

[57] ABSTRACT

The present invention comprises a system and method for a GSM receiver to perform channel estimation under the assumption that the analog-to-digital (A/D) converter is free-running. A search process is employed, whereby the known GSM training signal is sampled with a plurality of phases which vary incrementally from zero to a full symbol period. For each phase a sample set (of the training signal) is generated. Furthermore, each sample set is used, together with the received samples, in a cross-correlation procedure to obtain a candidate impulse response vector for the transmission channel. Thus a plurality of candidate impulse response vectors are produced, one of which will be selected to be the optimal representative for the transmission channel. The optimal impulse response vector is selected as follows. Each impulse response vector is convolved with the corresponding sample set, thus producing an estimated output vector. The estimated output vectors are compared with the vector of received samples (from the free-running A/D converter), and the estimated output vector which is closest in the Euclidean (square-norm) sense designates the impulse response vector which is optimal.

53 Claims, 7 Drawing Sheets

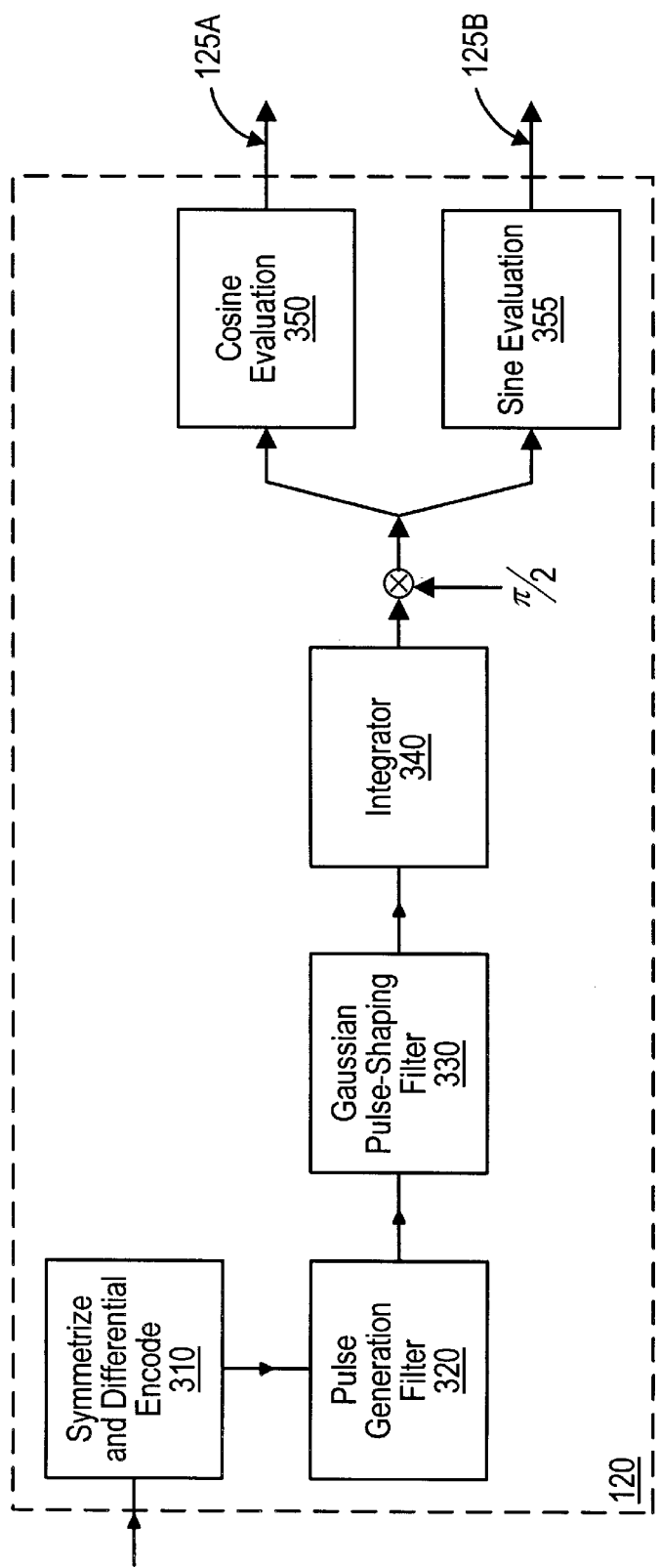

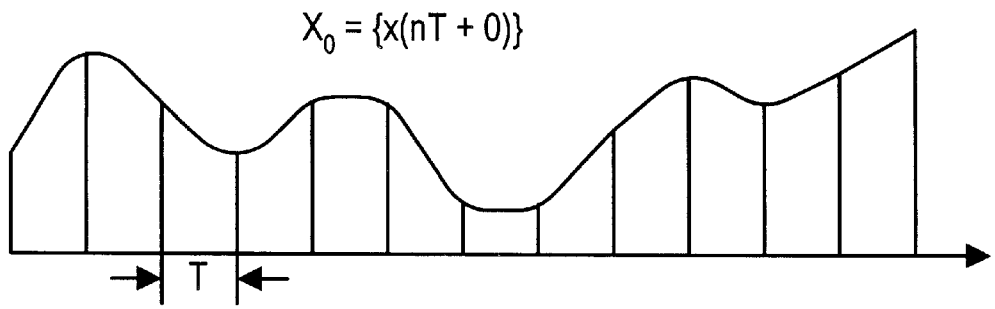
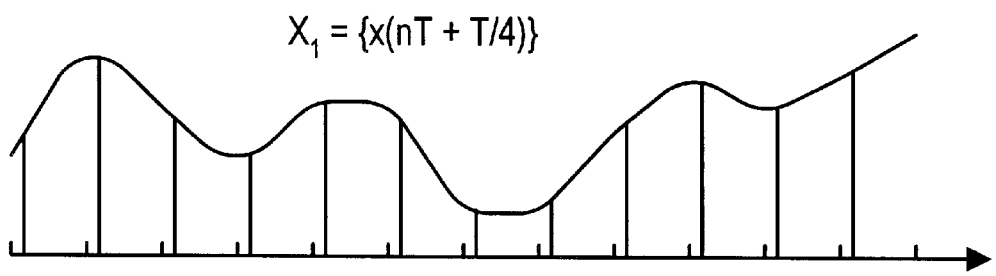
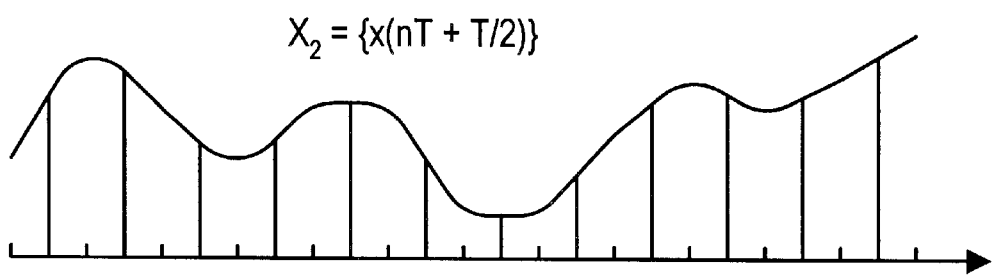
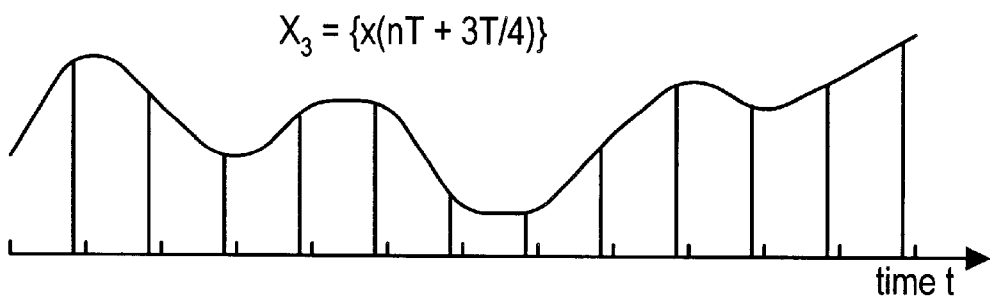
FIG. 4

SYSTEM AND METHOD FOR ESTIMATING A SET OF PARAMETERS FOR A TRANSMISSION CHANNEL IN A COMMUNICATION SYSTEM

CROSS REFERENCE TO RELATED APPLICATION(S)

This application claims benefit of priority of provisional application Serial No.: 60/040,195 filed Mar. 4, 1997, titled Robust Channel Estimator for GSM Applications.

FIELD OF THE INVENTION

This invention is related to the field of channel estimation in the context of cellular radio communication, and particularly to a channel estimation algorithm for a receiver structure in the GSM cellular radio system.

DESCRIPTION OF THE RELATED ART

In the GSM cellular radio system, base stations and mobile units transmit and receive digitized voice data in the 900 MHz band. The 890–915 MHz band is reserved for mobile-to-base transmissions (up link), and the 935–960 MHz band is reserved for base-to-mobile transmissions (down link). These bands are divided into channels which are 200 kHz wide. A pair of channels, an up link channel and a down link channel, separated by 45 MHz is described by an Absolute Radio Frequency Channel Number (ARFCN). In normal communications each mobile unit is assigned an ARFCN, asserting its transmissions over the up link channel, and receiving base station transmissions over the down link channel.

Each base station is capable of operating over several ARFCNs. Furthermore, on each ARFCN the base station may be in contact with up to eight mobile units. The mobile units share an ARFCN by a scheme of Time-Division Multiple Access (TDMA), wherein communications over the up link and down link channels are divided into frames, and each frame is further sub-divided into eight time-slots. Each of the eight mobile units is assigned a time-slot number and is expected to confine its transmissions on the up link channel to the corresponding time-slot, and to receive down-link transmissions in the corresponding time-slot. Thus the GSM transmitter (base or mobile) must assemble speech data into bursts (of length 148 bits). When asserting the burst during a time-slot, the transmitter shapes the power envelope of the transmitter RF signal in conformity with a GSM power-ramping time-mask [ETSI GSM 05.05, "European Digital Cellular Telecommunication System (Phase 2), Radio Transmission and Reception", p.34, September 1995]. The power envelope is used by the receiver (base or mobile) to detect the start of the burst and to synchronize its A/D sampling.

The GSM transmitter uses the Gaussian Minimum-Shift Keying (GMSK) modulation technique, in which the binary speech data is embedded onto a baseband signal that modulates the carrier with a bit rate of 270833 bits per second. The modulated carrier is transmitted into the atmosphere as an RF signal. The receiver accepts the RF signal from the atmosphere, and down-converts this RF signal to produce a baseband signal. Due to the effects of the atmosphere or transmission channel, the received baseband signal is a distorted version of the transmitted baseband signal. The distortions include atmospheric channel fading, multipath, noise, and the distortions imposed by the RF stages of the transmitter and receiver.

A typical GSM receiver structure includes: an RF stage which converts the received RF signal into a baseband signal; an analog-to-digital (A/D) converter which samples the baseband signal at a rate of 270833 samples per second, i.e. once per bit interval, to produce a sequence of received samples; a channel estimator which estimates parameters describing the transmission channel on a burst by burst basis; and a Viterbi equalizer which uses the channel parameters to demodulate the binary speech data from the A/D samples.

In the 900 MHz band transmissions are subject to channel fading and multipath, which results in significant inter-symbol interference (ISI). Furthermore, the RF stages of the transmitter and the receiver are non-ideal, and exhibit their own transfer characteristics. The channel estimator is designed to estimate parameters which describe the transmission channel, i.e. estimate the transfer function of the transmission channel. In this application, the transmission channel is interpreted to include one or more (preferably all) of the signal stages between the transmitted baseband and received baseband signals. Thus the transmission channel includes one or more of the following: the RF stage of the transmitter, the atmospheric medium, and the RF stage of the receiver. The channel estimator assumes that the transmission channel can be modeled as a discrete-time linear system, and calculates the impulse response of this linear model.

To facilitate the estimation procedure for the transmission channel impulse response, each transmitter burst contains known training data. In particular, every burst, which comprises 148 successive bits, contains a training sequence of length 26 bits. There are eight different training sequences used in GSM communications, all of which were chosen because of their nearly optimal auto-correlation behavior. The channel estimator uses the samples of the received burst and the known training sequence in its estimation algorithm. The Viterbi equalizer uses the transmission channel impulse response or transfer function calculated by the channel estimator to process the received samples and compensate for the ISI. In doing so, the Viterbi equalizer demodulates the encoded binary speech data.

In order to fit a discrete linear model to the transmission channel, the channel estimator must provide the linear model with an input and output sequence. The input sequence comprises samples of the transmitted baseband signal, and the output sequence is quite naturally determined by the received digital samples output from the A/D converter. In prior art systems it has been the practice to control the A/D converter so that samples of the received baseband signal are obtained at favorable locations within each bit interval; i.e. it has been necessary to control the phase of the A/D converter (not the sampling rate). The favorable locations are determined ultimately by the bandwidth of the Gaussian pulse-shaping filter used in the GMSK modulation. By obtaining a sample 2.5 symbol periods after the assertion of each binary digit, the ISI is minimized [see page 172 of: Wireless Digital Communications: Modulation and Spread Spectrum Applications by Dr. Kamilo Feher, ISBN 0-13-098617-8]. Such practice has required prior art GSM receivers to include circuitry for recovering bit synchronization. Furthermore the A/D converters in prior art receivers have required a control input and extra logic to allow for sample timing adjustment.

Thus a system and method is needed whereby the channel estimation can be performed successfully without controlling A/D sample timing. Such a method would allow the receiver structure to be simplified; and the A/D converter, not needing the extra control input and logic, would consume less power and occupy less semiconductor die area.

SUMMARY OF THE INVENTION

The present invention comprises a system and method for performing channel estimation in a GSM receiver. The channel estimation operates under the assumption that the analog-to-digital (A/D) converter is free-running. Thus, samples of the received baseband signal are obtained with unknown (but constant) phase. The received baseband signal is a distorted version of a transmitted baseband signal, due to the effects of the transmission channel. During the training phase of every GSM signal burst, the transmitted baseband signal is completely known to the receiver: this known signal is called the training signal. Since the phase used to obtain the received samples is not controlled, it is not known apriori which samples of the training signal would best correspond with the received samples. In other words, since the phase offset of the received samples is not known, it is not known which samples of the transmitted training signal should be used in correlation with the received samples.

In the system and method of the present invention a search process is employed. First, the training signal is sampled with a plurality of phases which vary incrementally from zero to a full symbol period. For each phase a sample set of the training signal is generated. Furthermore, each sample set is used, together with the received samples, in a cross-correlation procedure to obtain a candidate impulse response vector for the transmission channel. Thus, a plurality of candidate impulse response vectors are produced, one for each of the phase offsets. Finally, one of the impulse response vectors is selected to be the optimal representative for the transmission channel.

The cross-correlation procedure operates on a sample set and the received samples to produce a candidate impulse response vector; one candidate impulse response vector is produced for each sample set. In the preferred embodiment, the cross-correlation procedure involves performing two cross-correlations: a cross-correlation between the received samples and the known binary data (embedded in the training signal), and a cross-correlation between the sample set and the same binary data. These two correlations are connected by an underlying linear system. By solving this underlying linear system, a candidate impulse response vector is produced. In particular, the linear system is solved by matrix inversion. A vector is composed from the results of the first cross-correlation, and a matrix is composed from the results of the second cross-correlation. The matrix is inverted, and the inverted matrix is multiplied by the vector. The product specifies the candidate impulse response vector.

Applying this correlation procedure for each sample set, a plurality of candidate impulse response vectors is generated. The first cross-correlations between the received samples and the known binary data need be performed only once for a received signal burst. Furthermore since the second cross-correlations involve the known sample sets and the known binary data, the inverted correlation matrices may be calculated and stored pre-operationally (at compile time or design time, before operation of the system). Thus the calculation of the impulse response vectors involves performing the first cross-correlation (of received sample and binary data) once per received signal burst, and multiplying the resulting correlation vector by a plurality of stored inverse matrices.

The optimal impulse response vector is selected as follows. Each impulse response vector is convolved with the corresponding sample set, thus producing an estimated output vector. The estimated output vectors are compared with the vector of received samples, and the estimated output vector which is closest, preferably in the Euclidean (square-norm) sense, designates the impulse response vector which is optimal. This impulse response vector, which best describes the transmission channel, can then be used to demodulate the binary data embedded in the received samples.

BRIEF DESCRIPTION OF THE DRAWINGS

A better understanding of the present invention can be obtained when the following detailed description of the preferred embodiment is considered in conjunction with the following drawings, in which:

FIG. 2 is a diagram of the structure of a GSM data burst.

FIG. 3 is a block diagram of a GMSK Modulator.

FIG. 4 is an illustration of the means by which sampling is performed on the known training signal, to generate a plurality of sample sets.

FIG. 5 (referring collectively to FIGS. 5A, 5B, and 5C) presents flowcharts which illustrate the method of the present invention.

Figure 1:
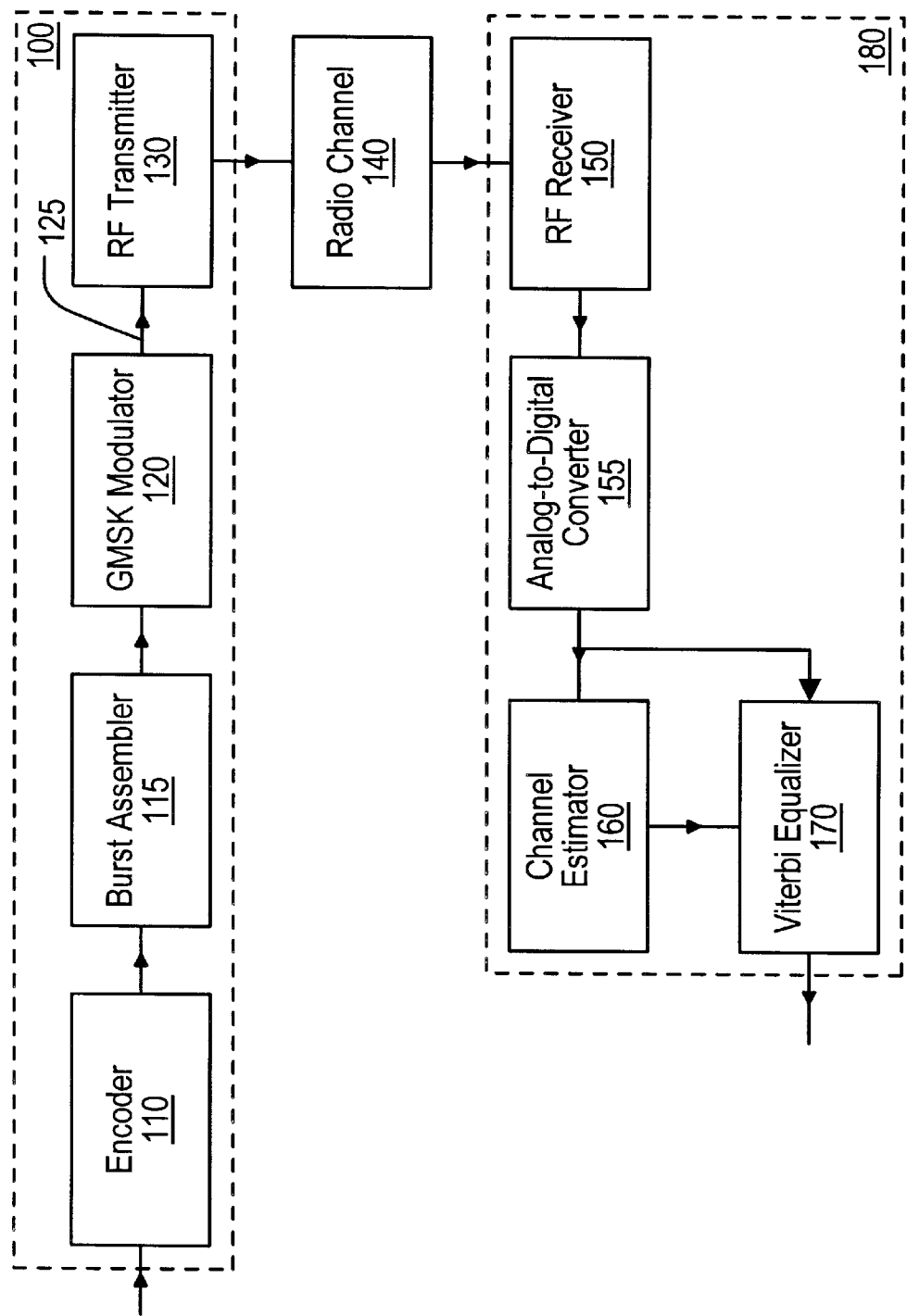
FIG. 1 is a block diagram of the GSM transmission system.

While the invention is susceptible to various modifications and alternative forms specific embodiments are shown by way of example in the drawings and will herein be described in detail. It should be understood however, that drawings and detailed description thereto are not intended to limit the invention to the particular form disclosed. But on the contrary the invention is to cover all modifications, equivalents and alternatives following within the spirit and scope of the present invention as defined by the appended claims.

DETAILED DESCRIPTION OF THE PREFERRED EMBODIMENT

Referring now to FIG. 1, a block diagram of a GSM transmission system is shown. The present invention is preferably used in a GSM system, and the invention is described below with reference to a GSM system. However, it is noted that the present invention can be used in other communication systems and/or with other communication standards, as desired.

The GSM transmission system comprises a GSM transmitter 100, a Radio Channel 140, and a GSM receiver 180. The GSM transmitter 100 comprises an Encoder 110, a Burst Assembler 115, a GMSK Modulator 120, and an RF Transmitter 130. The GSM Receiver 180 comprises an RF Receiver 150, an Analog-to-Digital (A/D) Converter 155, a Channel Estimator 160, and a Viterbi Equalizer 170.

The Encoder 110 receives a stream of sampled voice data and performs speech and channel coding as well as encryption. The resulting bit stream is assembled into bursts of length 148 bits by the Burst Assembler 115. The assembled bursts are modulated using Gaussian Minimum-Shift Keying in the GMSK Modulator 120. The resulting baseband signal is imaged onto an RF carrier and transmitted by the RF Transmitter 130. The transmitted RF signal experiences a host of distortion phenomenon as it propagates through the atmosphere, all of which are summarized by the functional block denoted Radio Channel 140. The distortions include channel fading, multipath, and noise. The RF Receiver 150 accepts the RF signal from the atmosphere, and down-converts this RF signal to generate a baseband signal. The received baseband signal is a distorted version of the transmitted baseband signal.

The A/D Converter 155 samples the received baseband signal at a rate of 270833 bits per second, and supplies the samples to the Channel Estimator 160 and Viterbi Equalizer 170. According to the present invention, the A/D Converter 155 is not required to receive control signals to control the sample timing. Therefore, the A/D converter 155, not needing extra control inputs and logic, can be designed so as to consume less power and occupy less die area than A/D converters in prior art GSM receivers. The A/D converter 155 samples at a constant rate, but at an unknown phase offset within each bit interval.

The Channel Estimator 160 uses the baseband signal samples to calculate, on a burst by burst basis, the impulse response or transfer function of the transmission channel, which includes one or more of the RF Transmitter 130, the Radio Channel 140, and the RF Receiver 150. The Channel Estimator 160 includes an improved system and method according to the present invention for estimating the channel parameters, i.e. the transmission channel impulse response or transfer function, even though the phase offset of the received signals is unknown.

The Channel Estimator 160 provides the impulse response, also called the channel estimate or channel parameters, to the Viterbi Equalizer 170. The Viterbi Equalizer 170 uses the channel estimate in a Maximum Likelihood Sequence Estimation algorithm to demodulate the data bits from the received baseband samples.

GSM Transmitter Background

The GSM Transmission system illustrated in FIG. 1 applies to transmission both from mobile unit to base station and from base station to mobile unit. The signal processing structure is similar in both directions. For a complete exposition of the invention, background on the operation of a GSM transmitter is deemed appropriate.

The functional elements of the GSM Transmission system will be described in detail. For those functional elements which are not relevant to the present invention, the corresponding description has been omitted for simplicity.

The Burst Assembler 115 receives a bit stream from the Encoder 110, and packages the bit stream into bursts of length 148 bits. Since GSM specifies Time Division Multiple Access (TDMA) signaling, i.e. multiple mobile units share a common frequency channel by a scheme of time-domain multiplexing, GSM transmitters must transmit data by means of time-limited signal bursts.

Referring now to FIG. 2, a diagram of the burst structure is shown. A burst comprises two sub-blocks of encrypted data 200 and 210, each of length 58 bits. The two sub-blocks are separated by a sequence of 26 training bits 220. Furthermore the sub-blocks are bounded by tail bit sequences 230 and 240, each of length 3 bits. The training sequence is included in every burst to facilitate channel estimation by the receiver. In GSM communications there are eight different training sequences, all of which have been chosen because of their nearly optimal auto-correlation behavior. The bursts are modulated in the GMSK Modulator 120 using Gaussian Minimum-Shift Keying (GMSK).

Referring now to FIG. 3, a block diagram of the GMSK Modulator 120 is shown. The GMSK Modulator 120 receives from the Burst Assembler 115 a sequence of 148 successive bits denoted $\{a_0, a_1, a_2, a_3, \ldots, a_{147}\}$ where each bit $\alpha_k$ takes the value 0 or 1. Before modulation however, the bits are symmetrized and differentially encoded in Symmetrize and Differential Encode Unit 310. By applying the transformation $b_k = 2a_k - 1$ a symmetric bit stream $\{b_0, b_1, b_2, b_3, \ldots, b_{147}\}$ is generated, i.e. the symmetrized bits take the values 1 or −1. The symmetric bit stream is differentially encoded according to the equation $$d_k = b_k \cdot b_{k-1}$$

with $b_{-1}$ defined to be −1, thereby generating bit stream $\{d_0, d_1, d_2, d_3, \ldots, d_{147}\}$.

The differentially encoded bit stream is then formed into a bipolar NRZ signal by pulse-generation filter 320. This is accomplished by applying the bit stream $\{d_0, d_1, d_2, d_3, \ldots, d_{147}\}$ to a filter whose impulse response p(t) is a unit amplitude rectangular pulse with turn-on interval $0 \leq t \leq T$, where T is the bit encoding interval, also called symbol interval, equal to 3.692 $\mu$sec. The differential bit stream is supplied to the pulse-generation filter as a series of impulses $$\sum_{k=0}^{147} d_k \delta(t - kT),$$

where $\delta(t)$ is the dirac delta function. Thus the NRZ signal can be represented as $$\sum_k d_k p(t - kT).$$

The bipolar NRZ signal is then smoothed with a Gaussian pulse shaping filter 330 whose impulse response g(t) is a Gaussian function defined by $$g(t) = B\sqrt{\frac{2\pi}{\ln 2}} \exp\left[-\frac{2\pi^2 B^2}{\ln 2}(t - 2T)^2\right]$$

with time-bandwidth product BT equal to 0.3. Thus function g(t) has even symmetry about time t=2T. Furthermore, outside the time-interval $0 \leq t \leq 4T$, the function g(t) is essentially zero. The smoothed NRZ signal can be represented as $$\sum_k d_k r(t - kT)$$

where r(t) is the convolution of p(t) and g(t).

The smoothed NRZ signal is then applied to an integrator 340. The output of the integrator can be represented as $$\sum_k d_k q(t - kT).$$

where q(t) is the result of applying r(t) to an integrator, i.e.

$$q(t) = \int_0^T r(s)ds.$$

The function q(t) rises smoothly from zero to one in the time interval from zero to 5T, and has odd symmetry about time t=2.5T.

The output of the integrator is multiplied by $\pi/2$ to generate phase signal $$\phi(t) = \frac{\pi}{2}\sum_{k=0}^{147} d_k q(t-kT).$$

Let [r] denote the greatest integer which is less than or equal to real number r. Since the function q(·) is zero for negative values of the argument and one for values of the argument greater than 5T, we can develop a more precise expression for the phase function, namely $$\phi(t) = \frac{\pi}{2}\sum_{k=0}^{n-5} d_k + \frac{\pi}{2}\sum_{k=n-4}^{n} d_k q(t-kT)$$

where n=[t/T], or in other words t=nT+λ where 0≤λ<T. The current bit $d_n$ and its four immediate predecessors are still interacting with the filter q(·) at time t=nT+λ, however bits which excited the filter at times kT for k≤n–5 have fully excited the filter q(·), and the response due to these bits has fully developed to amplitude 1.

Next, in-phase and quadrature signals I(t) and Q(t) are generated by evaluating the cosine and sine respectively of the phase function $\phi(t)$; these evaluations are performed in Cosine and Sine Evaluation Units 350 and 355 respectively. The in-phase and quadrature signals together define complex baseband signal $x(t)=I(t)+jQ(t)=e^{j\phi(t)}$. The output 125A of the Cosine Evaluation Unit 350 carries the in-phase signal I(t), and the output 125B of the Sine Evaluation Unit 355 carries the quadrature signal Q(t). Together, outputs 125A and 125B comprise the output 125 (referenced in FIG. 1) of the GMSK Modulator 120.

Observe that the signal x(t) is completely determined by the bit stream $a_k$. In particular, because the bits of the training sequence, bits $a_{61}$ through $a_{86}$, are system defined, the signal x(t) is defined up to a multiplicative constant for times 65T≤t≤87T. The last data bit immediately preceding the training sequence, bit $a_{60}$, stimulates the phase generation filter q(·) at time 60T and requires duration 5T for its output to fully develop. This explains the lower bound 65T. The first data bit after the training sequence, bit $a_{87}$, starts stimulating the filter q(·) and contributing to the phase at time 87T. Between times 65T and 87T the phase function and thus x(t) is completely determined by the training sequence bits and is thus complete known to the receiver. The transmitted baseband signal x(t), during this period where the training sequence bits are stimulating the GMSK modulator, is referred to as the training signal.

The in-phase and quadrature signals are fed to the RF transmitter 130. The RF Transmitter 130 images the complex baseband signal x(t) onto an RF carrier for transmission through the atmosphere.

The RF Receiver 150 accepts a corresponding signal from the atmosphere, and down-converts this RF signal to generate a baseband signal y(t), which is a distorted version of the transmitted baseband x(t). The distortions include channel fading, multipath, noise, and transmitter and receiver characteristics.

The baseband signal y(t) is sampled by the A/D converter 155 with sampling rate 270833 samples per second, to produce a sequence of received samples $\{y_0,y_1,y_2,y_3 \ldots, y_{147}\}$. Note that the A/D converter 155 obtains one sample per bit interval (also called symbol interval).

The Channel Estimator 160 according to the Present Invention

Operation of the Channel Estimator 160 of the present invention is now described in detail. According to the present invention, the Channel Estimator 160 uses the received samples and its apriori knowledge of the training sequence bits to estimate the impulse response (or transfer function) of the transmission channel. In the present disclosure, the term "transmission channel" means one or more of the signal processing and/or radio propagation stages between the transmitted baseband signal x(t) and the received baseband signal y(t). In the preferred embodiment, the term "transmission channel" includes all of the signal processing and radio propagation stages between the transmitted baseband signal x(t) and the received baseband signal y(t); thus the transmission channel preferably includes the RF Transmitter 130, the Radio Channel 140, and the RF Receiver 150.

Since, in the context of GSM, one desires to obtain a discrete-time linear model for the transmission channel between two analog signals, i.e. the transmitted baseband x(t) and the received baseband y(t), the analog signals must be sampled. In the system and method of the present invention it is assumed that the samples of the received baseband y(t) are obtained with arbitrary (but constant) phase. As mentioned above, one benefit of the present invention is that the A/D converter 155 is allowed to free-run, without external timing adjustment. Furthermore the samples of the transmitted baseband x(t) are obtained during the training interval, i.e. when the training signal is being asserted.

Given a discrete-time linear system with impulse response sequence h(n), random input sequence X(n), and output sequence v(n), then the output sequence can be expressed as a convolution sum:

$$v(n) = \sum_{k=0}^{L-1} h(k)X(n-k)$$

where L is the length of the impulse response h(n). To calculate such an impulse response for the transmission channel, it is necessary to choose samples of the transmitted training signal x(t) to serve as input X(n) for the model. Naturally one is constrained to use the received samples from the A/D converter as the output v(n) for the model. However since the phase used to obtain the received samples was not controlled, it is not known apriori how to sample the transmitted training signal to correspond with the received samples. In other words, since the phase offset of the received samples is not known, it is not known which samples of the transmitted training signal should be used in correlation with the received samples.

In the system and method of the present invention, a search process is employed, whereby the transmitted training signal x(t) is sampled with a plurality of phases which vary incrementally, thereby generating a plurality of sample sets (of the transmitted training signal). In other words, the present invention uses a plurality of sample sets of the transmitted training signal in performing the channel estimation. A candidate impulse response vector is then calculated for each sample set, and the "best" candidate impulse response vector is used as the impulse response for the transmission channel.

To illustrate the process of calculating an impulse response, assume that a phase $\Delta$ is chosen and the training signal samples are obtained with this phase, namely $X(n) = x(nT+\Delta)$ where n is an integer index which runs through 26 consecutive values which correspond to the training sequence bits. This involves evaluating the known mathematical expression x(t) for the transmitted training signal at the indicated times during the training interval. Now the estimation problem specializes to finding an impulse response h(n) which achieves $$y_n = \sum_{k=0}^{L-1} h(k)X(n-k).$$

Next, the system and method of the present invention performs a cross-correlation between the received samples $y_n$ and the known symmetrized bit stream $\{b_0, b_1, b_2, b_3, \ldots, b_{147}\}$, and a cross-correlation between the training signal samples and the symmetrized bit stream. In view of the last equation for $y_n$, this cross-correlation can be expressed in terms of the mathematical expectations as $$E[b_n y_{n+\tau}] = \sum_{k=0}^{L-1} h(k)E[b_n X(n+\tau-k)]$$

wherein $\tau$ is an integer delay index. The cross-correlations are calculated by means of time-averages over the index n (which are explicitly specified later in this discussion). Since the impulse response constitutes L unknown coefficients, one must generate a system of L equations to determine the impulse response. This is achieved by calculating the indicated cross-correlations for L distinct values of the delay index $\tau$. This involves calculating L cross-correlations between the symmetrized bit stream and the received values, and $L^2$ cross-correlations between the symmetrized bit stream and the training signal samples (since these correlations depend on the index k as well as $\tau$). In the preferred embodiment of this invention the linear system is solved by matrix inversion. Namely, if we define the matrix R of dimension L×L whose components $R(\tau,k)$ are given by $R(\tau,k) = E[b_n X(n+\tau-k)]$, and the vector V of dimension L×1 whose components $V(\tau) = E[b_n y_{n+\tau}]$, then the unknown impulse response may be calculated as the matrix product of $R^{-1}V$.

By repeating this procedure for a plurality of P distinct phases which incrementally vary from zero to a full symbol period, one generates a plurality of sample sets $X_0, X_1, X_2, \ldots, X_{P-1}$ from the training signal, a plurality of inverted cross-correlation matrices $M_0, M_1, M_2, \ldots, M_{P-1}$, and a plurality of impulse response vectors $h_0, h_1, h_2, \ldots, h_{P-1}$.

Referring now to FIG. 4, an illustration of the plurality of samples sets $X_0, X_1, X_2, \ldots, X_{P-1}$ and their means of generation is presented, for the special case of P=4. In the preferred embodiment of the present invention, the sample sets from the transmitted training signal $X_0, X_1, X_2, \ldots, X_{P-1}$ are generated as illustrated in the follow pseudo-code fragment.

```
for(k=0, k<P, k++)
{
    Δ = k/P T
    for(n=0, n<26, n++)
    {
        X_k[n] = x(nT + 2T + Δ)
    }
}
```

Since the functional expression for the training signal, x(t), is defined by the GSM specification, preferably the sample sets are calculated and stored in the GSM receiver prior to operation.

Observe that the cross-correlation vector V, needs to be calculated only once for a received signal burst. Furthermore the correlation matrices above depend only on the known symmetrized training sequence and the known mathematical expression for the transmitted training signal. Thus, these correlation matrices may be calculated pre-operationally, i.e. at compile time of software realizing the method, or at design time of hardware realizing the system. In the preferred embodiment of the present invention the inverted cross-correlation matrices $M_k$ are calculated and stored pre-operationally. Thus upon receiving a signal burst, the impulse response vectors $h_k$ are calculated as illustrated by the following code-fragment:

```
V = Correlate1
for(k=0, k<P, k++)
{
    h_k = M_k V
}
``` wherein the function Correlate1 summarizes the calculation of vector V as described above, wherein P is the number distinct phases $\Delta$, and thus the number of distinct sample sets (of the transmitted training signal) generated using the distinct phases.

Furthermore, in the preferred embodiment of the present invention the sample sets $X_0, X_1, X_2, \ldots, X_{P-1}$ are convolved with their respective impulse response vectors $h_0, h_1, h_2, \ldots, h_{P-1}$ to generate a corresponding collection of output vectors $Y_0, Y_1, Y_2, \ldots, Y_{P-1}$ as illustrated by the following code fragment:

```
for(k=0, k<P, k++)
{
    Y_k = h_k * X_k
}
```

Thus in the preferred embodiment of the present invention the sample sets from the training signal $X_0, X_1, X_2, \ldots, X_{P-1}$ must be stored, however they are preferably calculated pre-operationally.

Finally, each of the output vectors $Y_0, Y_1, Y_2, \ldots, Y_{P-1}$ are compared with a vector composed from the received values $Y = \{y_0, y_1, y_2, y_3, \ldots, y_{147}\}$. In the preferred embodiment of the invention, the comparison is performed by calculating the Euclidean (square-norm) length of the vector differences. The output vector $Y_{best}$ which is closest to Y, specifies the channel vector $h_{best}$ which is chosen to serve as the impulse response for the transmission channel. This best channel vector is supplied to the Viterbi Equalizer 170. This process is illustrated by the following pseudo-code fragment:

```
MinError=LargeNumber
for(k=0, k<P, k++)
{
    Error = ∑_{n=0}^{15} |Y_k(n + 4) − Y(n + 67)|² if(Error < MinError)
    {
        MinError = Error
        MinIndex = k
    }
}
``` wherein the symbol |z| denotes taking the absolute value of a complex number. In an alternate embodiment the errors are calculated using the sum of absolute values instead of the sum of squares as given in the preferred embodiment.

Figure 7:
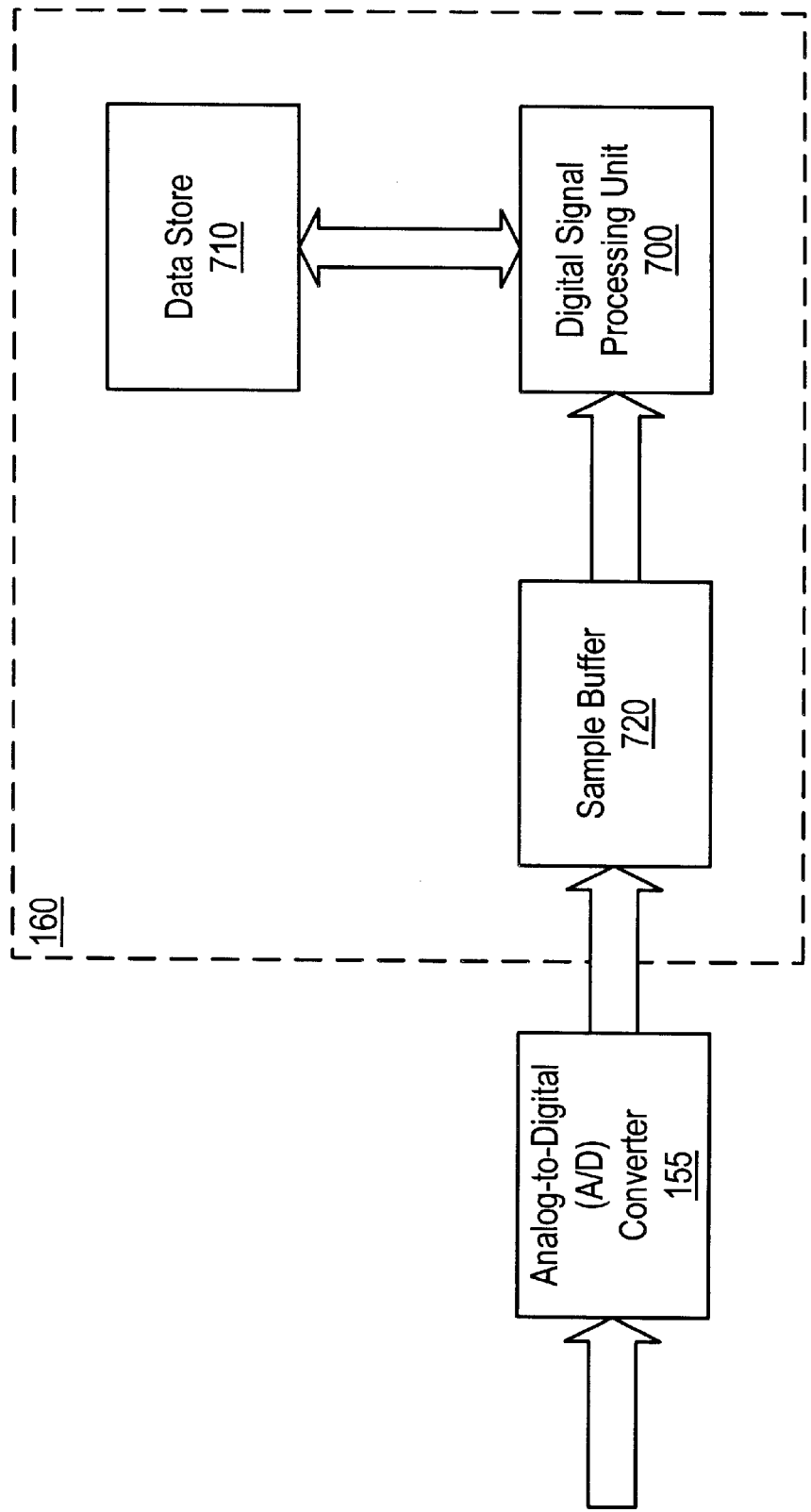
FIG. 7 is a block diagram of a digital signal processing system according to the preferred embodiment of the present invention.

Referring now to FIG. 7, a block diagram of a digital signal processing system, in which channel estimation is performed according to the preferred embodiment of the present invention, is shown. The digital signal processing system comprises a digital signal processing (DSP) unit 700, a Data Store 710, a Sample Buffer 720, and an A/D converter 155. The DSP unit 700 is coupled to the Data Store 710 and the Sample Buffer 720. The A/D converter 155 is coupled to the Sample Buffer 720. The A/D converter 155 receives a baseband analog signal from the RF receiver 150 (of FIG. 1), and samples the baseband signal at a rate of 270833 samples per second. As mentioned above, the A/D converter 155 is allowed to free-run, i.e. to continuously acquire samples of the received baseband signal with unknown (but constant) phase. The A/D converter 155 writes the digital samples to the Sample Buffer 720. In the preferred embodiment of the invention, the Data Store 710 comprises Read Only Memory (ROM), Random Access Memory (RAM), FLASH memory or any desirable combination thereof. The Data Store 710 stores: executable code for the DSP unit 700; data for the DSP unit 700 to utilize in performing channel estimation; and the intermediate results of computations performed by the DSP unit 700. In the preferred embodiment of the invention, the Sample Buffer 720 is a Random Access Memory (RAM).

The DSP unit 700 reads code and data from the Data Store 710, and/or the sample buffer 720, and performs the channel estimation method. In so doing, the DSP unit 700 read and writes intermediate results of computations from and to (respectively) the Data Store 710. Preferably the DSP unit 700 is a specialized digital signal processing device. In other embodiments of the invention, the DSP unit 700 could be a general purpose processor, programmable logic, or a microcontroller.

The Channel Estimator 160 (of FIG. 1) comprises the DSP unit 700, the Data Store 710, and the Sample Buffer 720.

The sample buffer 720 is designed to store at least 148 successive samples of a received baseband signal y(t). Since the received baseband signal is a complex signal, i.e. comprising in-phase and quadrature components, each sample of the received baseband signal requires two storage locations. Thus the sample buffer 720 comprises an array of at least 296 storage locations.

The DSP unit 700 monitors the power of the received samples in the Sample Buffer 720 to determine the beginning of a signal burst. The power envelope of GSM signal bursts conform to the standard established in ETSI GSM 05.05, *European Digital Cellular Telecommunication System (Phase 2), Radio Transmission and Reception*, p.34, September 1995. The system and method of the present invention operates on a sequence of 148 successive received samples, obtained during the assertion of the signal burst. Since the signal burst has time duration equal to 148 bit intervals, it is necessary to obtain 148 successive samples of the signal burst, one for each bit interval. However since the A/D controller is free-running, without phase adjustment, the samples are not necessarily obtained at times which are optimal with respect to the GMSK modulation scheme. (Recall that in the context of GSM reception, inter-symbol interference is minimized when samples are obtained 2.5 bit intervals after the bit assertion times). The Channel Estimator 160 of the present invention allows a GSM receiver to perform channel estimation is a way which overcomes this difficulty of non-optimal sample timing. Thus the A/D converter 155 is able to achieve a simpler and more efficient form, not needing the extra phase adjustment logic and control inputs, than in prior art receivers.

Hereafter, these 148 successive samples, obtained during the signal burst, and stored in the Sample Buffer 720, will be denoted by the vector Y. The vector Y has length 148, and has complex entries. The complex entries of Y comprise successive samples of the complex received signal y(t).

The Data Store 710 stores, among other things, a collection of twelve inverted correlation matrices $M_0, M_1, M_2, \ldots, M_{11}$ (same as those described above) which are used in the present invention to calculate twelve candidate channel vectors, of which one (of these channel vectors) will be chosen to be the most appropriate model for the transmission channel. Each matrix has dimension 5×5. Furthermore the entries of each matrix are complex. In the preferred embodiment of the invention, the correlation matrices are computed and stored prior to operation in conjunction with a GSM receiver. The method used to compute these matrices is explained in detail below.

The Data Store 710 stores, among other things, the 26 successive bits of a GSM training sequence given by the values {0,0,1,0,0,1,0,1,1,1,0,0,0,0,1,0,0,0,1,0,0,1,0,1,1,1}. The values of the GSM training sequence are correlated with the received samples comprising vector Y. The result of this correlation is used along with the correlation matrices $M_0, M_1, M_2, \ldots, M_{11}$ to calculate the twelve candidate channel vectors.

The Data Store 710 stores, among other things, a collection of twelve data vectors $X_0, X_1, X_2, \ldots, X_{11}$ which are used along with the candidate channel vectors to decide which channel vector is best, i.e. most closely approximates the transmission channel. Each data vector has length 26 and has complex entries The following pseudo-code illustrates the method used to generate the data vectors $X_k$. In the preferred embodiment of the invention, these data vectors $X_k$ are computed and stored in Data Store 710 prior to operation of the invention is conjunction with a GSM receiver.

```
for(k=0, k<12, k++)
{
    Δ = k/12 T
    for(n=0, n<26, n++)
    {
```

-continued

```
    X_k[n] = x(nT + 2T + Δ)
  }
}
```

Thus each data vector $X_k$ comprises a sequence of 26 samples of the function x(t) obtained with a phase $\Delta$ which depends on the index k. The function x(t) is defined as the baseband complex envelope which arises from a GMSK modulator, when the modulator is excited by the encoded bits of the GSM training sequence. Therefore $x(t)=e^{j\Phi(t)}$, where the function $$\phi(t) = \frac{\pi}{2} \sum_{k=0}^{25} d_k q(t - kT).$$

The values $d_k$ are obtained by symmetrizing and differentially encoding the bits $a_k$ of the GSM training sequence. The training bits $a_k$ are symmetrized according to the equation $b_k=2a_k-1$. The resulting symmetrized bits $b_k$ take the value 1 or -1. Denote the values of the symmetrized training sequence by the vector $B=\{b_0,b_1,b_2,\ldots,b_{25}\}$. The symmetrized bits are then differentially encoded according to the equation $d_k=b_k \cdot b_{k-1}$, wherein the multiplication is a standard integer multiplication, wherein $b_{-1}$ is defined to be -1.

The function q(t) is defined as $$\int_0^t r(s)ds,$$

where $r(t)=g(t)*p(t)$, i.e. the convolution of g(t) and p(t). The function p(t) is a unit amplitude rectangular pulse with turn-on interval given by $0 \leq t \leq T$. The function g(t) is given by $$g(t) = B\sqrt{\frac{2\pi}{\ln 2}} \exp\left[-\frac{2\pi^2 B^2}{\ln 2}(t - 2T)^2\right],$$

wherein T is the symbol interval (3.69231 $\mu$sec), and the time-bandwidth product BT equals 0.3.

Recall that the Data Store 710 also stores a collection of twelve correlation matrices $M_0, M_1, M_2, \ldots, M_{11}$. The following code fragment describes how to generate the $M_k$ matrices.

```
for(k=0, k<12, k++)
{
    M_k = [Correlate2(X_k,B)]^-1
}
``` where the superscript -1 denotes matrix inversion, and Correlate2( , ) is a function which accepts the data vector $X_k$ and the symmetrized training sequence vector B as input. The Correlate2(,) function returns a 5×5 matrix whose entries are cross-correlations between the data vector $X_k$ and the training sequence B. In particular, the $(\tau,l)$ entry, i.e. the entry occupying the $\tau^{th}$ row and $l^{th}$ column, of the returned matrix is given by $$\frac{1}{16}\sum_{i=5}^{20} b_i X_k(i + \tau - l)$$

wherein the indices $\tau$ and l take the values zero through four. In the preferred embodiment of the invention the correlation matrices are calculated and stored pre-operationally.

Figure 5A:
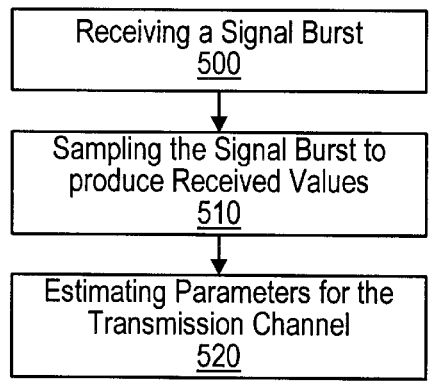
FIG. 5A presents the invention in overview.
Figure 5B:
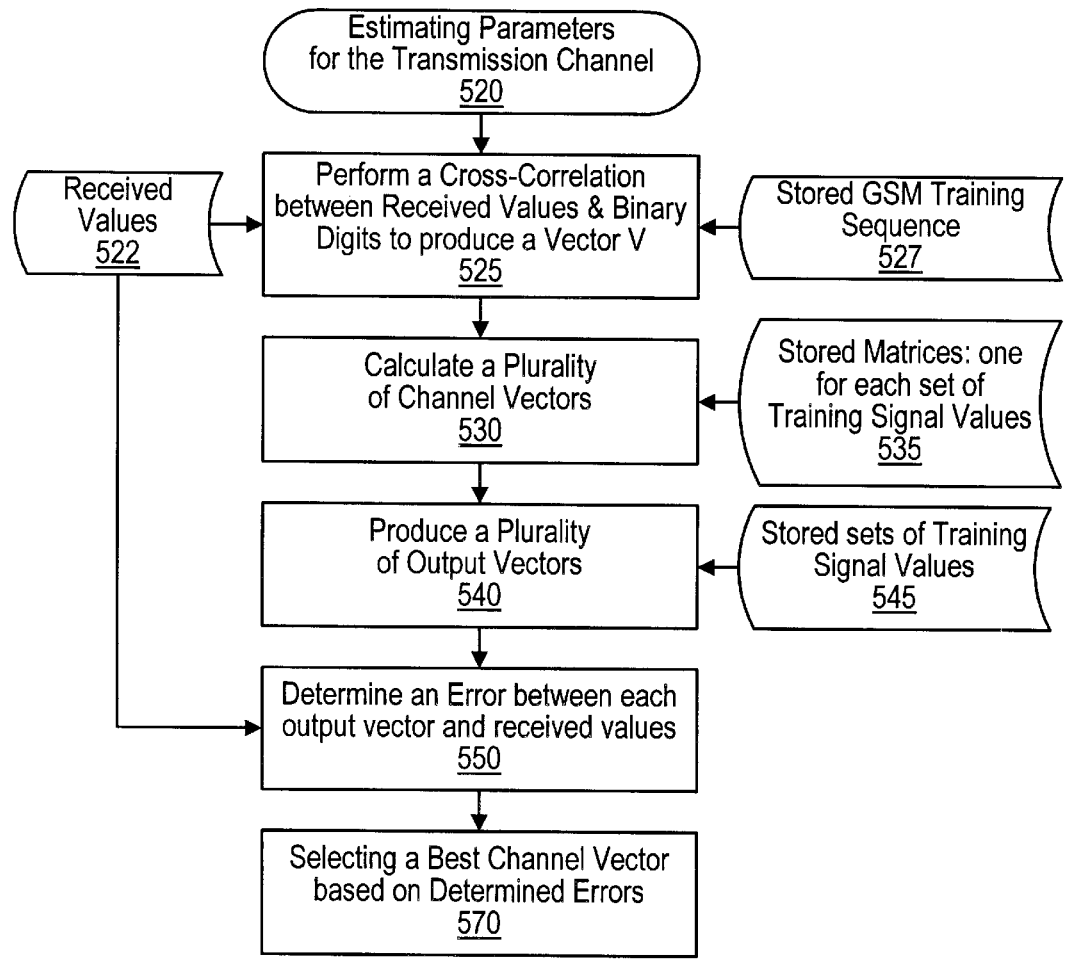
FIG. 5B presents the preferred embodiment of the channel estimation process.

Referring now to FIG. 5 (comprising FIGS. 5A and 5B), a flowchart of the method of the present invention is shown. The steps of the method are explained in conjunction with the block diagram of FIG. 7. As has been mentioned, the present invention comprises a method and system for estimating a set of parameters for the transmission channel. The method involves receiving a signal burst from the transmission channel (step 500 of FIG. 5A). Since the transmission channel includes, among other things, the RF Receiver 150, receiving a signal burst from the transmission channel means receiving the baseband output of the RF Receiver 150. [In an alternate embodiment, the transmission channel includes only the Radio Channel 140 (of FIG. 1), in which case receiving a signal burst from the transmission channel means receiving an RF signal burst from the atmosphere.]

Next, the signal burst is sampled (step 510 of FIG. 5A). The sampling is performed by A/D converter 155 (of FIG. 7). The sampling is performed so as to obtain one sample in each of a plurality of bit intervals. The A/D converter 155 writes the digital samples of the signal burst into Sample Buffer 720. The digital samples are referred to as received values. The received values, stored in the Sample Buffer 720, are represented by the data structure 522 (of FIG. 5B).

It is noted that, in the preferred embodiment of this invention, the plurality of bit intervals are contiguous (i.e. side-by-side without skipping bit intervals). However other embodiments are easily conceived where samples are obtained from a plurality of non-contiguous bit intervals.

Referring now to FIG. 5B, the process of estimating parameters for the transmission channel (step 520 of FIG. 5A) involves the following steps. Here, it is presumed that the stored sets of training signal values, vectors $X_0, X_1, X_2, \ldots, X_{11}$ from the discussion above, have been pre-calculated and stored in Data Store 710. These stored sets of training signal values are represented by data structure 545 (in FIG. 5B). Furthermore, it is presumed that the inverted correlation matrices, matrices $M_0, M_1, M_2, \ldots, M_{11}$ from the discussion above, have also been pre-calculated and stored in Data Store 710. The stored matrices $M_0, M_1, M_2, \ldots, M_{11}$ are represented by data structure 535 (of FIG. 5B). Additionally, it is presumed that the values of the GSM training sequence {0,0,1,0,0,1,0,1,1,1,0,0,0,0,1,0,0,0,1,0,0, 1,0,1,1,1} are stored in Data Store 710. This stored GSM training sequence is represented by data structure 527 (of FIG. 5B).

First, the method calculates a cross-correlation (step 525 of FIG. 5B) between the received values and the stored training sequence, to produce a cross-correlation vector V, the same vector V as discussed above. To implement this calculation, the DSP unit 700 reads the vector Y of received values from the sample buffer 720, and also reads the training sequence from the Data Store 720. The DSP unit 700 symmetrizes the training sequence according to the equation $b_k=2a_k-1$, wherein $a_k$ represents the bits of the training sequence. Then the DSP unit 700 performs a cross-correlation between the received values and the symmetrized training sequence, and thereby generates a vector V of dimension 5×1, whose $\tau^{th}$ component is given by $$\frac{1}{16}\sum_{i=5}^{20} b_i Y(66+i+\tau).$$

Next, the method calculates a plurality of channel vectors $h_0,h_1,h_2, \ldots ,h_{11}$ (step 530 of FIG. 5B), the same vectors $h_0,h_1,h_2, \ldots ,h_{11}$ as discussed above, using the stored matrices $M_0,M_1,M_2, \ldots ,M_{11}$ in data structure 535 (of FIG. 5B). To calculate the channel vectors, the DSP unit 700 reads each of the matrices $M_k$ from Data Store 710, and multiplies them one by one with vector V to generate a collection of twelve estimated channel vectors $h_0,h_1,h_2, \ldots ,h_{11}$. The following code fragment illustrates this calculation.

```
for(k=0, k<12, k++)
{
    h_k = M_k V
}
```

The juxtaposition of $M_k$ and V is meant to imply matrix multiplication.

In step 540 (of FIG. 5B), the method further involves producing a plurality of output vectors $Y_0,Y_1,Y_2,Y_3, \ldots , Y_{11}$. These output vectors are the same as the output vectors $Y_0,Y_1,Y_2,Y_3, \ldots ,Y_{11}$ explained above. One output vector is produced for each channel vector. To produce the output vectors, the DSP unit 700 reads each set of training signal values, vectors $X_k$, from the Data Store 710 and convolves each with the corresponding channel vector, thereby generating a collection of twelve estimated output vectors $Y_0,Y_1, Y_2,Y_3, \ldots ,Y_{11}$. The following code fragment illustrates this calculation.

```
for(k=0, k<12, k++)
{
    Y_k = h_k * X_k
}
```

The symbol * denotes convolution. It is to be noted that in an alternate embodiment, the output vector might be calculated using a Discrete Fourier Transforms, since convolution is equivalent to multiplication in the frequency domain.

Next, in step 550 (of FIG. 5B), the method determines an error between each of the output vectors and the received values of the signal burst. To determine these errors, the DSP unit 700 accesses the received values, i.e. vector Y, from the Sample Buffer 720, and calculates the Euclidean (square-norm) distance of each output vector $Y_k$ from the vector of received values Y. This calculation is illustrated by the following code fragment:

```
for(k=0, k<12, k++)
{
```
$$\text{Error}_k = \sum_{n=0}^{15} [Y_k(n+4) - Y(n+67)]^2$$
```
}
``` wherein $\text{Error}_k$ denotes the error associated with the $k^{th}$ output vector $Y_k$.

In step 570 (of FIG. 5B), the method selects a best channel vector based on the determined errors, wherein the coefficients of the best channel vector specify the parameters for the transmission channel. The DSP unit 700 implements the selection by choosing the channel vector whose output vector $Y_k$ is closest to Y. In other words, the DSP unit 700 chooses the channel vector whose output vector minimizes the square error. The following code fragment illustrates this calculation.

```
MinError=LargeNumber
for(k=0, k<12, k++)
{
    if(Error_k < MinError)
    {
        MinError = Error_k
        MinIndex = k
    }
}
```

The index of the output vector which achieves the minimum error, MinIndex in the above code fragment, specifies the channel vector which is accepted as the best model for the transmission channel.

Figure 5C:
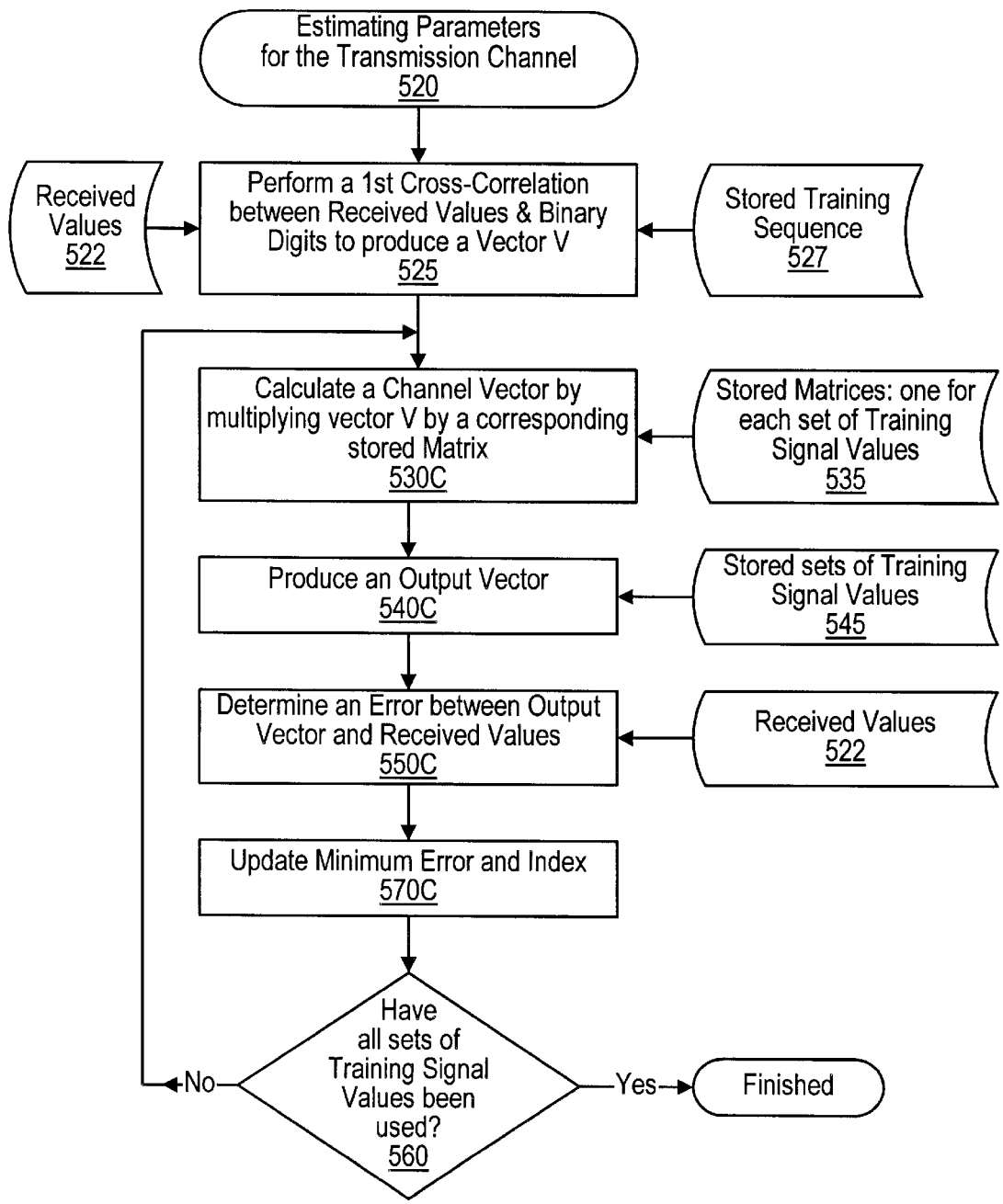
FIG. 5C presents an alternate embodiment of the channel estimation process.

Although the steps 530, 540, 550, and 570 of FIG. 5B have been described as separate loops, these steps can be equivalently implemented in one loop as illustrated in FIG. 5C, and as in the following code fragment:

```
for(k=0, k<12, k++)
{
    h_k = M_k V
    Y_k = h_k * X_k
```
$$\text{Error} = \sum_{n=0}^{15} [Y_k(n+4) - Y(n+67)]^2$$
```
    if(Error < MinError)
    {
        MinError = Error
        MinIndex = k
    }
}
``` wherein the variable Error is a scalar (not a vector). In FIG. 5C, step 530C performs the multiplication of each stored matrix $M_k$ with the cross-correlation vector V produced in step 525. Step 540C performs the calculation of each output vector $Y_k$ by convolving the $k^{th}$ set of training signal values (i.e. vector $X_k$) and the $k^{th}$ channel vector $h_k$. Step 550C determines the square error between the $k^{th}$ output vector $Y_k$ and the vector of received values Y. And Step 570C checks, for each new output vector $Y_k$, whether a minimum error has been achieved, and if so records the new minimum value and the index k. Thus when the loop has used every set of training signal values, the output vector which minimizes the square errors will have been found, and the index of this output vector specifies the best channel vector for the transmission channel. The fact that the loop is iterated so as to utilize all the sets of training signal values is indicated by the conditional branching step 560 of FIG. 5C.

Figure 6:
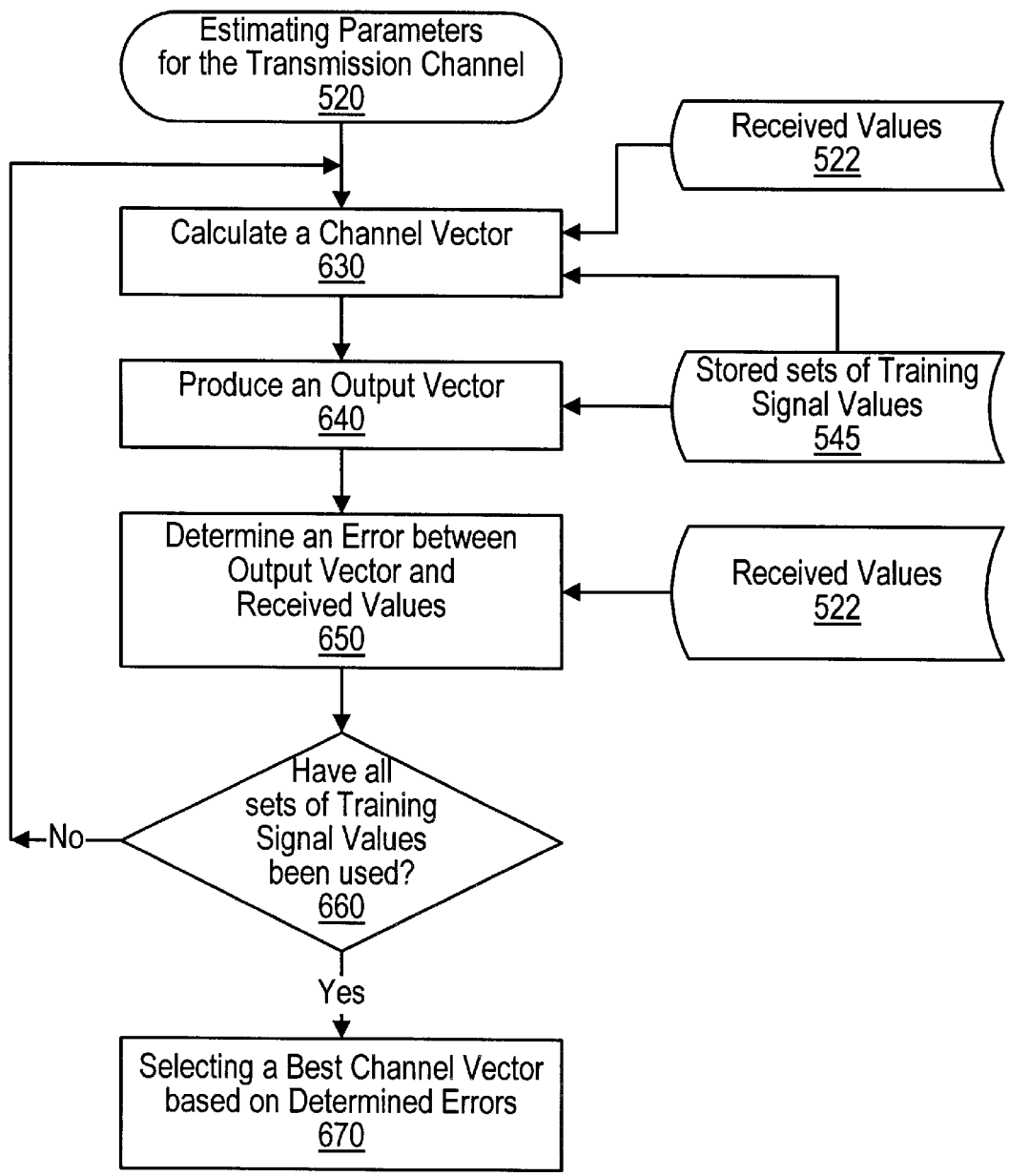
FIG. 6 is a flowchart which is used to motivate a discussion of possible alternate embodiments of the parameter estimation process.

Referring now to FIG. 6, a flowchart is presented, which serves to facilitate the following discussion alternate embodiments for the channel estimation process (step 520 of FIG. 5A) according to the present invention. Here again, it is presumed that the stored sets of training signal values have been pre-calculated and are available. First, the method calculates a channel vector in step 630 for each of a plurality of sets of training signal values. The $i^{th}$ channel vector is calculated using the $i^{th}$ set of training signal values and the received values, wherein i is an integer index which runs through the values 0, 1, 2, ..., P−1, wherein P denotes the number of sets of training signal values. The $i^{th}$ channel vector can be calculated using any system estimation technique, provided that the system model is supplied with the $i^{th}$ set of training signal values as a stimulus and the received values as response.

In step 640, the parameter estimation further involves producing an output vector for each calculated channel vector, wherein the $i^{th}$ output vector is produced using the $i^{th}$ set of training signal values and the $i^{th}$ channel vector. This involves feeding the $i^{th}$ set of training signal values to the system model mentioned above, wherein the parameters of the system model are supplied by the $i^{th}$ channel vector.

Next, in step 650, the parameter estimation method determines an error between each of said output vectors and the received values of said signal burst. Any technique for measuring the distance between vectors may be employed in this step. As shown, step 660 represents the fact that steps 630, 640, and 650 are performed for each of a plurality of sets of training signal values.

Finally, in step 670 the parameter estimation method selects a best channel vector based on the determined errors, wherein the coefficients of the best channel vector specify the parameters for the transmission channel.

Although the system and method of the present invention has been described in connection with the preferred embodiment and several alternate embodiments, it is not intended to be limited to the specific forms set forth herein, but on the contrary, it is intended to cover such alternatives, modifications, and equivalents, as can be reasonably included within the spirit and scope of the invention as defined by the appended claims.

We claim:

1. A method for estimating a set of parameters for a transmission channel in a communication system, the method comprising:

receiving a signal burst from the transmission channel, wherein the signal burst comprises a training signal transmitted through the transmission channel, wherein the training signal encodes a sequence of binary digits (bits), wherein the training signal is known to a receiver;

sampling the signal burst at least once in each of a plurality of bit intervals and thereby producing a sequence of received values;

estimating a set of parameters for the transmission channel, where said estimating comprises:

calculating a channel vector for each of a plurality of sets of training signal values, wherein an $i^{th}$ channel vector is calculated using an $i^{th}$ set of training signal values and the received values, wherein i is an integer index which runs through the values 0, 1, 2, ..., P−1, wherein P denotes the number of sets of training signal values;

producing an output vector for each calculated channel vector, wherein an $i^{th}$ output vector is produced using the $i^{th}$ set of training signal values and the $i^{th}$ channel vector;

determining an error between each of said output vectors and the received values of said signal burst;

selecting a best channel vector based on said determined errors;

wherein coefficients of the best channel vector specify the parameters for the transmission channel.

2. The method of claim 1, wherein each set of training signal values comprises samples of the training signal obtained at substantially corresponding times in each of said plurality of bit intervals.

3. The method of claim 2, wherein each bit interval is divided into P equally-spaced subintervals, further comprising:

obtaining the $i^{th}$ set of training signal values by sampling the training signal at times which fall within a pre-defined tolerance of an $i^{th}$ point within an $i^{th}$ subinterval of said P equally-spaced subintervals;

wherein i is the integer index which runs through the values 0, 1, 2, ..., P−1.

4. The method of claim 3, wherein the pre-defined tolerance is equal to zero.

5. The method of claim 3, wherein the sequence of binary digits is also known to the receiver, and wherein said estimating the set of parameters for the transmission channel further comprises:

performing a first cross-correlation between the received values and the sequence of binary digits to produce a correlation vector V;

wherein said calculating the $i^{th}$ channel vector comprises multiplying the correlation vector V by an $i^{th}$ matrix in a plurality of P stored matrices.

6. The method of claim 5, wherein the $i^{th}$ matrix $M_i$ of said plurality of P stored matrices is calculated by performing a second cross-correlation between the $i^{th}$ set of training signal values and the sequence of binary digits, thereby producing a correlation matrix, and inverting the correlation matrix to generate an inverted matrix $M_i$.

7. The method of claim 6, further comprising: calculating and storing said plurality of P stored matrices prior to said estimating.

8. The method of claim 1, wherein the $i^{th}$ output vector is defined as the output of a linear system supplied with the $i^{th}$ set of training signal values as an input, wherein the behavior of the linear system is characterized by the $i^{th}$ channel vector.

9. The method of claim 8, wherein the $i^{th}$ output vector is produced by convolving the $i^{th}$ set of training signal values and the $i^{th}$ channel vector.

10. The method of claim 1, wherein said determining the error comprises determining a square error between each of said output vectors and the received values of said signal burst.

11. The method of claim 1, wherein said selecting the best channel vector based on said determined errors comprises selecting the channel vector whose output vector results in a minimum error.

12. The method of claim 1, wherein said sampling the signal burst comprises performing A/D conversion in which the sampling phase is not controlled.

13. The method of claim 1, wherein said communication system is a GSM communication system, wherein said sequence of binary digits is a training sequence in a GSM traffic burst, wherein said training signal is a baseband complex envelop defined by the Gaussian Minimum-Shift Keying modulation scheme.

14. The method of claim 1, wherein said parameters for the transmission channel comprise an impulse response of the transmission channel.

15. The method of claim 1, further comprising: providing said parameters for the transmission channel to an equalizer, wherein said equalizer uses said parameters for demodulation of the sequence of binary digits.

16. The method of claim 1, further comprising: demodulating the sequence of binary digits using said parameters for the transmission channel.

17. The method of claim 1, wherein the $i^{th}$ channel vector comprises a candidate set of parameters for the transmission channel corresponding to the $i^{th}$ set of training signal values.

18. A system for estimating a set of parameters for a transmission channel in a communication link, the system comprising:

a receiver designed to receive a signal burst from the transmission channel, wherein the signal burst comprises a training signal transmitted through the transmission channel, wherein the training signal encodes a sequence of binary digits, wherein the training signal is known to the receiver;

an analog-to-digital converter configured to sample the signal burst at least once in each of a plurality of bit intervals and thereby to produce a sequence of received values;

a channel estimator which estimates parameters for the transmission channel;

wherein the channel estimator calculates a channel vector for each of a plurality of sets of training signal values, wherein an $i^{th}$ channel vector is calculated using an $i^{th}$ set of training signal values and the received values, wherein i is an integer index which runs through the values 0, 1, 2, . . . , P–1, wherein P denotes the number of sets of training signal values;

where the channel estimator produces an output vector for each calculated channel vector, wherein an $i^{th}$ output vector is produced using the $i^{th}$ set of training signal values and the $i^{th}$ channel vector;

wherein the channel estimator determines an error between each of said output vectors and the received values of said signal burst;

wherein the channel estimator selects a best channel vector based on said determined errors;

wherein coefficients of the best channel vector specify the parameters for the transmission channel.

19. The system of claim 18, wherein each set of training signal values comprises samples of the training signal obtained at substantially corresponding times in each of said plurality of bit intervals.

20. The system of claim 19, wherein each bit interval is divided into P equally-spaced subintervals;

wherein the $i^{th}$ set of training signal values is obtained by sampling the training signal at times which fall within a pre-defined tolerance of an $i^{th}$ point within an $i^{th}$ subinterval of said P equally-spaced subintervals;

wherein i is the integer index which runs through the values 0, 1 2, . . . , P–1.

21. The system of claim 20, wherein the pre-defined tolerance is equal to zero.

22. The system of claim 20, wherein the sequence of binary digits is also known to the receiver, and wherein said channel estimator is configured to perform a first cross-correlation between the received values and the sequence of binary digits to produce a correlation vector V;

wherein said $i^{th}$ channel vector is calculated by multiplying the correlation vector V by an $i^{th}$ matrix in a plurality of P stored matrices.

23. The system of claim 22, wherein the $i^{th}$ matrix of said plurality of P stored matrices is calculated by performing a second cross-correlation between the $i^{th}$ set of training signal values and the sequence of binary digits, thereby producing a correlation matrix, and inverting the correlation matrix to generate said $i^{th}$ matrix.

24. The system of claim 23, further comprising a memory which stores said sets of training signal values and said plurality of P stored matrices, wherein said sets of training signal values and said plurality of P stored matrices are calculated and stored in said memory prior to operational mode of the system.

25. The system of claim 18, wherein the $i^{th}$ output vector is defined as the output of a linear system supplied with the $i^{th}$ set of training signal values as an input, wherein the behavior of the linear system is characterized by the $i^{th}$ channel vector.

26. The system of claim 25, wherein the $i^{th}$ output vector is produced by convolving the $i^{th}$ set of training signal values and the $i^{th}$ channel vector.

27. The system of claim 18, wherein said determining the error comprises determining a square error between each of said output vectors and the received values of said signal burst.

28. The system of claim 18, wherein said selecting the best channel vector based on said determined errors comprises selecting the channel vector whose output vector results in the minimum error.

29. The system of claim 18, wherein said sampling the signal burst is performed by an A/D converter which runs freely without controlling sampling phase.

30. The system of claim 18, wherein said communication link is a GSM communication system, wherein said sequence of binary digits is a training sequence in a GSM traffic burst, wherein said training signal is a baseband complex envelop defined by the Gaussian Minimum-Shift Keying modulation scheme.

31. The system of claim 18, wherein said parameters for the transmission channel comprise an impulse response.

32. The system of claim 18, wherein said parameters for the transmission channel are provided to an equalizer for demodulation of the sequence of binary digits.

33. The system of claim 32, wherein said equalizer is a Viterbi equalizer.

34. The system of claim 18, wherein the $i^{th}$ channel vector comprises a candidate set of parameters for the transmission channel corresponding to the $i^{th}$ set of training signal values.

35. The system of claim 18, wherein said system for estimating parameters for a transmission channel is implemented on one or more integrated circuits.

36. A computer-readable storage medium comprising program instructions, wherein said program instructions are operable to implement steps for estimating a set of parameters for a transmission channel in a communication system, the steps comprising:

receiving a signal burst from the transmission channel, wherein the signal burst comprises a training signal transmitted rough the transmission channel, wherein the training signal encodes a sequence of binary digits (bits), wherein the training signal is known to a receiver;

sampling the signal burst at least once in each of a plurality of bit intervals and thereby producing a sequence of received values;

estimating the set of parameters for the transmission channel, where said estimating comprises:

calculating a channel vector for each of a plurality of sets of training signal values, wherein an $i^{th}$ channel vector is calculated using an $i^{th}$ set of training signal values and the received values, wherein i is an integer index which runs through the values 0, 1, 2, . . . , P–1, wherein P denotes the number of sets of training signal values;

producing an output vector for each calculated channel vector, wherein an $i^{th}$ output vector is produced using the $i^{th}$ set of training signal values and the $i^{th}$ channel vector;

determining an error between each of said output vectors and the received values of said signal burst;

selecting a best channel vector based on said determined errors;

wherein coefficients of the best channel vector specify the parameters for the transmission channel.

37. The medium of claim 36, wherein each set of training signal values comprises samples of the training signal obtained at substantially corresponding times in each of said plurality of bit intervals.

38. The medium of claim 37, wherein each bit interval is divided into P equally-spaced subintervals, further comprising:

obtaining the $i^{th}$ set of training signal values by sampling the training signal at times which fall within a pre-defined tolerance of an $i^{th}$ point within an $i^{th}$ subinterval of said P equally-spaced subintervals;

wherein i is the integer index which runs through the values 0, 1, 2, . . . , P–1.

39. The medium of claim 38, wherein the pre-defined tolerance is equal to zero.

40. The medium of claim 38, wherein the sequence of binary digits is also known to the receiver, and wherein said estimating the set of parameters for the transmission channel further comprises:

performing a first cross-correlation between the received values and the sequence of binary digits to produce a correlation vector V;

wherein said calculating the $i^{th}$ channel vector comprises multiplying the correlation vector V by an $i^{th}$ matrix in a plurality of P stored matrices.

41. The medium of claim 40, wherein the $i^{th}$ matrix $M_i$ of said plurality of P stored matrices is calculated by performing a second cross-correlation between the $i^{th}$ set of training signal values and the sequence of binary digits, thereby producing a correlation matrix, and inverting the correlation matrix to generate an inverted matrix $M_i$.

42. The medium of claim 41, further comprising: calculating and storing said plurality of P stored matrices prior to said estimating.

43. The medium of claim 36, wherein the $i^{th}$ output vector is defined as the output of a linear system supplied with the $i^{th}$ set of training signal values as an input, wherein the behavior of the linear system is characterized by the $i^{th}$ channel vector.

44. The medium of claim 43, wherein the $i^{th}$ output vector is produced by convolving the $i^{th}$ set of training signal values and the $i^{th}$ channel vector.

45. The medium of claim 36, wherein said determining the error comprises determining a square error between each of said output vectors and the received values of said signal burst.

46. The medium of claim 36, wherein said selecting the best channel vector based on said determined errors comprises selecting the channel vector whose output vector results in a minimum error.

47. The medium of claim 36, wherein said sampling the signal burst comprises performing A/D conversion in which the sampling phase is not controlled.

48. The medium of claim 36, wherein said communication system is a GSM communication system, wherein said sequence of binary digits is a training sequence in a GSM traffic burst, wherein said training signal is a baseband complex envelop defined by the Gaussian Minimum-Shift Keying modulation scheme.

49. The medium of claim 36, wherein said parameters for the transmission channel comprise an impulse response of the transmission channel.

50. The medium of claim 36, further comprising: providing said parameters for the transmission channel to an equalizer, wherein said equalizer uses said parameters for demodulation of the sequence of binary digits.

51. The medium of claim 36, further comprising: demodulating the sequence of binary digits using said parameters for the transmission channel.

52. The medium of claim 36, wherein the $i^{th}$ channel vector comprises a candidate set of parameters for the transmission channel corresponding to the $i^{th}$ set of training signal values.

53. A channel estimator which estimates a set of parameters for a transmission channel in a receiving system, wherein the receiving system comprises:

a receiver designed to receive a signal burst from the transmission channel, wherein the signal burst comprises a training signal transmitted through the transmission channel, wherein the training signal encodes a sequence of binary digits, wherein the training signal is known to the receiving system;

an analog-to-digital (A/D) converter configured to sample the signal burst at least once in each of a plurality of bit intervals and thereby to produce a sequence of received values;

a sample buffer configured to store said sequence of received values;

a data store configured to store executable code and data, wherein the data comprises a plurality of P sets of training signal values, wherein P is an integer, wherein each set of ting signal values comprises samples of the training signal obtained at substantially corresponding times in each of a plurality of bit intervals;

a digital signal processing (DSP) unit which is configured to read the executable code from the data store, to write computational results to the data store, and to read said received values from the Sample Buffer;

wherein said channel estimator comprises:
the sample buffer;
the data store; and
the DSP unit;
wherein the DSP unit estimates the parameters for the transmission channel by running the executable code, and thereby performing steps comprising:

calculating a channel vector for each of the sets of training signal values, wherein an $i^{th}$ channel vector is calculated using an $i^{th}$ set of training signal values and the received values, wherein i is an integer index which runs through the values 0, 1, 2, . . . , P–1, wherein P denotes the number of sets of training signal values;

producing an output vector for each calculated channel vector, wherein an $i^{th}$ output vector is produced using the $i^{th}$ set of training signal values and the $i^{th}$ channel vector;

determining an error between each of said output vectors and the received values of said signal burst;

selecting a best channel vector based on said determined errors;

wherein the coefficients of the best channel vector specify the parameters for the transmission channel.

* * * * *

UNITED STATES PATENT AND TRADEMARK OFFICE
CERTIFICATE OF CORRECTION

PATENT NO. : 6,026,130
DATED : February 15, 2000
INVENTOR(S) : Rahmatullah, et. al.

It is certified that error appears in the above-identified patent and that said Letters Patent is hereby corrected as shown below:

Claim 36, col. 20, line 48, please delete "rough" and substitute --through--.
Claim 53, col. 22, line 32 please delete "ting" and substitute --training--.

Signed and Sealed this

Fourteenth Day of November, 2000

Q. TODD DICKINSON

*Attest:*

*Attesting Officer*            *Director of Patents and Trademarks*